(12) United States Patent
Lavie

(10) Patent No.: US 6,705,723 B1
(45) Date of Patent: Mar. 16, 2004

(54) METHOD AND A DEVICE FOR MOUNTING EYEGLASS LENSES

(76) Inventor: Philippe Lavie, 61 rue des Ebisoires, 78370 Plaisir (FR)

( * ) Notice: Subject to any disclaimer, the term of this patent is extended or adjusted under 35 U.S.C. 154(b) by 21 days.

(21) Appl. No.: 10/360,613

(22) Filed: Feb. 10, 2003

(30) Foreign Application Priority Data

Feb. 13, 2002 (FR) .............................................. 02 01807

(51) Int. Cl.⁷ .............................................. G02C 1/02
(52) U.S. Cl. ...................................................... 351/110
(58) Field of Search ................................ 351/110, 109, 351/103, 106, 90, 92, 91

(56) References Cited

U.S. PATENT DOCUMENTS 5,926,249 A * 7/1999 Lin ............................... 351/83

6,315,409 B1  11/2001  Watanabe

FOREIGN PATENT DOCUMENTS

| DE | 3306635 A1 | 8/1984 |
| DE | 29814426 U1 | 1/1999 |
| EP | 685754 A1 | 12/1995 |
| EP | 955560 A1 | 11/1999 |
| WO | WO 98/26322 | 6/1998 |

* cited by examiner

Primary Examiner—Hung X. Dang
(74) Attorney, Agent, or Firm—Lawrence E. Laubscher, Sr.

(57) ABSTRACT

A method and a device for mounting eyeglass lenses, wherein branches and a bridge are connected by plastics material filaments engaged in peripheral grooves in the lenses and having at their ends lugs extending over the lenses and including holes or eyelets through which are passed fixing means such as screws or rivets.

8 Claims, 3 Drawing Sheets

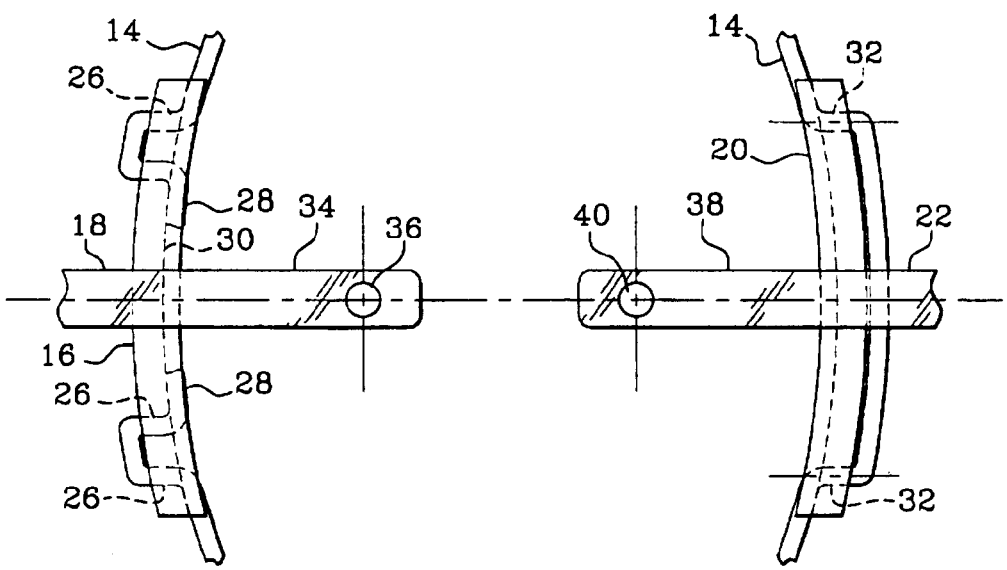

METHOD AND A DEVICE FOR MOUNTING EYEGLASS LENSES

BACKGROUND OF THE INVENTION

1. Field of the Invention

The present invention relates to a method and a device for mounting eyeglass lenses.

2. Description of the Prior Art

In a prior art method of mounting lenses, a plastics material ("nylon" or the like) filament is engaged in a peripheral groove in a lens and is attached at its ends to a frame which extends along the edge of the lens, usually at least along the top edge of the lens, and which has articulated branches at its ends and a central portion forming a bridge between the lenses.

This way of mounting lenses has the advantage of being light in weight, attractive in appearance, durable and easy for an optician to carry out. However, the frame portion extending along the top edge of the lenses forms a bar in the field of view of the wearer of the eyeglasses and gives a sensation of limiting their field of view.

To remedy this drawback, rimless eyeglasses have been proposed, in which articulated branches and a bridge are fixed directly to the lenses by means of screws, rivets or the like fitted into holes drilled into the lenses in the vicinity of their periphery. Rimless eyeglasses give the wearer a sensation of widened field of view, but it is relatively difficult to fit the branches and the bridge to the lenses. Because of the great diversity of lens, branch and bridge shapes and sizes, the fitter has no template for accurately marking the positions of the drilling points on the lenses. Mounting the lenses is therefore long and costly, because a relatively large number of lenses may be broken during mounting or made unusable by incorrect positioning of the holes relative to each other and to the lenses. What is more, the mounting is loose and unstable if the holes or the notches formed in the lenses are slightly oversized.

In one prior art device each articulated branch has a small lug that extends a few millimeters over the lens in a substantially radial direction and terminates in an eyelet or the like through which passes a screw or a rivet. Likewise, each end of the bridge is extended by a similar lug terminating in an eyelet through which a fixing screw or a rivet passes. For the mounting to be stable, an end of each articulated branch and each end of the bridge has another lug a few millimeters long, substantially perpendicular to the first lug and pressed onto the periphery of the lens.

To fit this device, one articulated branch and one end of the bridge are offered up to a lens, the position of the eyelets is marked on the lens with a pencil or the like, and the lens is drilled at the marked places. The positions of the eyelets must be marked with great accuracy and the lens must be drilled to the exact diameter of the fixing screws used. Otherwise, the mounting is slack and the branches and the bridge can turn relative to the lenses, which makes the eyeglasses difficult to wear and often requires the optician to start again with new lenses.

A particular object of the present invention is to alleviate these drawbacks by providing a method and a device for mounting lenses that are simple, accurate, easy to use, inexpensive, durable, light in weight and attractive in appearance.

OBJECT OF THE INVENTION

The invention provides a method of mounting eyeglass lenses on a frame comprising two articulated branches and a bridge having at their ends means for fixing them to the lenses and a small lug adapted to extend along the periphery of the lens, in which method, on each lens, said lug at one end of said bridge is connected to said lug on one articulated branch by a plastics material filament engaged in a peripheral groove in said lens, after which said articulated branch and said bridge are fitted to said lens by drilling said lens and fitting fixing means.

The method according to the invention combines the advantages of plastics material filaments and rimless eyeglasses but avoids their disadvantages. In particular, the positions of the holes to be drilled in the lenses are marked automatically when the branches and the bridge are fitted to the lenses and secured by the plastics material filament engaged in the peripheral grooves in the lenses. After drilling the holes in the lenses, it is a simple matter, taking only a few moments, to insert fixing members into the eyelets of the branches and the bridge and the holes in the lenses.

The invention provides too a device on which eyeglass lenses can be mounted, said device comprising two articulated branches and a bridge whose ends comprise small lugs intended to extend along the periphery of each lens and means for fixing said device to said lenses, in which device, for each lens, said lugs at the ends of an articulated branch and said bridge are connected by a plastics material filament engaged in a peripheral groove in said lens.

This device has the advantage of being simple, light in weight, attractive in appearance, inexpensive and usable without special adaptation for all shapes of lenses.

In one embodiment of the invention each branch includes said lug adapted to extend along the periphery of a lens to guide or attach the plastics material filament and another lug extending over a face of the lens and including an eyelet adapted to receive lens fixing means.

Likewise, the bridge includes at each of its ends said lug adapted to extend along the periphery of a lens to guide or attach the plastics material filament and another lug extending over a face of the lens and including an eyelet adapted to receive lens fixing means.

The eyelets are preferably circular or substantially circular.

The eyelets are simply holes formed in said other lugs of the branches and the bridge.

The fixing members include screws, rivets or the like or spring clips.

BRIEF DESCRIPTION OF THE DRAWINGS

Further features and advantages of the invention will be apparent from the following particular description of several preferred embodiments of the invention as illustrated in the corresponding accompanying drawings in which:

FIGS. 3 and 4 are partial diagrammatic front views to a larger scale of the essential components of the device.

DESCRIPTION OF THE PREFERRED EMBODIMENTS

Figure 1:
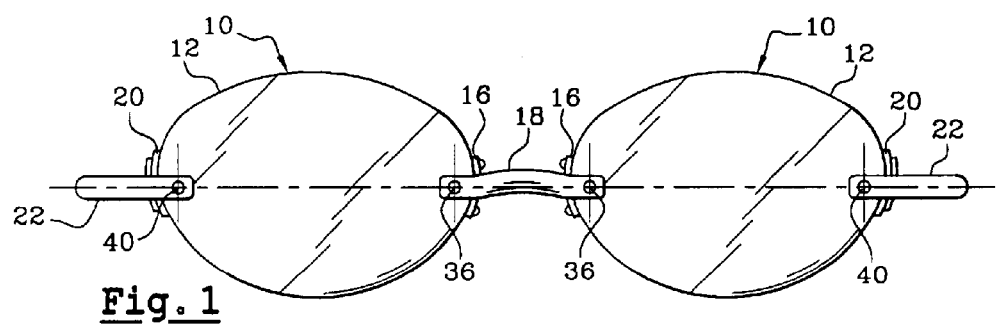
FIGS. 1 and 2 are diagrammatic front and plan views, respectively, of the device according to the invention.
Figure 2:
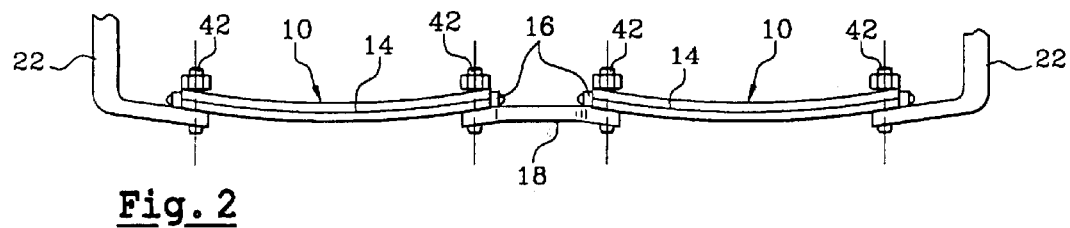

In the embodiment shown in FIGS. 1 and 2, the reference numbers 10 designate eyeglass lenses whose periphery 12 is formed with a continuous annular groove to receive a very fine, and therefore very hard to see, filament 14 of plastics material of the "nylon" or like type, having a diameter of 0.5 mm, for example. The formation of an annular groove in the peripheral edge of a lens is a standard and inexpensive operation and can be carried out easily and automatically by appropriate machines, with which opticians are generally equipped already. According to the invention, the filament 14 on each lens joins an end lug 16 of a bridge 18 to an end lug 20 of a branch 22 of the foldable or articulated type.

As can be seen better in FIGS. 3 to 6, the end lugs 16 of the bridge 18 are substantially perpendicular to the bridge and are slightly curved to follow the convex curved periphery of the lenses 10. The ends of the filaments 14 are fixed to the end lugs 16 in a conventional way. For example, each lug 16 has at each of its ends two parallel holes 26 in which the filament 14 is inserted and a groove 30 on its face in contact with the periphery of the lens to receive and mask the ends 28 of the filament 14.

Figures 5, 6:
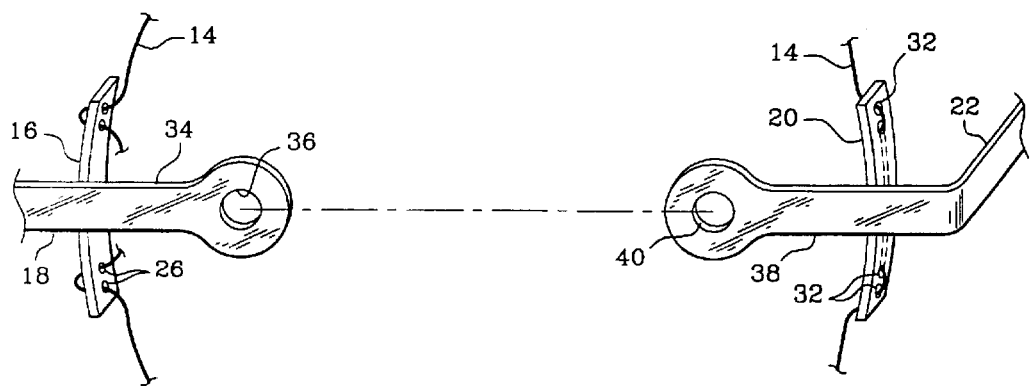
FIGS. 5 and 6 are partial diagrammatic perspective views of a different embodiment of the components.

Likewise, the lug 20 of each branch 22 extends perpendicularly to the branch, is curved to follow the periphery of a lens 10 and has at each of its ends at least one hole 32 for the filament 14 to pass through, either inside the lug 20, as shown in FIG. 6, or outside the lug 20, as shown in FIG. 4, relative to the lenses 10.

The lugs 16 of the bridge 18 and 20 of the articulated branches 22 are typically a few millimeters long.

The bridge 18 is extended at each end by a lug 34 which extends a short radial distance (for example less than 10 mm) over one face of the corresponding lens 10, preferably the exterior face of the lens. The lug 34 has a hole 36 through which passes a member for fixing it to the lens 10, for example a screw, a rivet or the like, or a spring clip, as described in more detail below.

Each eyeglass branch 22 also includes a lug 38 which extends radially over one face of the corresponding lens 10, preferably the exterior face of the lens, and which is short, typically less than 10 mm long, like the lug 34 of the bridge 18. The lug 38 of the branch 22 includes a hole 40 through which passes a fixing member of the type previously cited.

In the embodiment shown, the lugs 34 of the bridge 18 and 38 of the branches 22 are substantially aligned with each other. Of course, they could be oriented differently and extend more or less radially relative to the lenses, from their periphery.

Lenses are mounted in the following manner:

The branches 22 and the bridge 18 are mounted on the lenses 10 by means of the filaments 14 in the conventional way, each filament 14 being for example attached to one end of a branch 16 of the bridge 18, passed through the holes 32 in the lug 20 of the articulated branch 22, and then fitted into the peripheral groove of the corresponding lens 10, fed along to the vicinity of the other end of the lug 16 of the bridge 18, cut to length and attached at its free end to the lug 16. To this end, in a manner that is well known in the art, the end of the filament can be heated to melt it and form a ball of plastics material larger than the diameter of the hole 26 in the lug 16 through which the filament 14 passes. The free end of the filament 14 is attached to the lug 16 with the filament 14 disengaged from the peripheral groove in the lens 10, of course. The combination of the bridge 18, the branch 22 and the filament 14 is then refitted to the lens 10 by exploiting the elasticity of the filament 14. Passing the filament 14 through two adjoining holes 26, 32 in a lug 16 or 20 is generally sufficient for properly attaching the filament 14 to the lugs, especially if they are made of metal.

When the branches 22 and the bridge 18 are in the required positions on the lenses 10, the positions of the holes 36 and 40 are marked on the lenses and the lenses are drilled at the marked locations. The lenses can advantageously be drilled using the holes 36, 38 as drilling guides.

In the embodiment shown in FIG. 2, the members 42 for fixing the branches 22 and the bridge 18 to the lenses 10 are of the nut and bolt type. Fixing members in the form of rivets or spring clips, formed for example of bent pins made of spring wire or the like, can equally well be used. Fixing by means of spring clips can be consolidated by depositing a spot of glue into each hole in the lens.

As shown in FIG. 1, the positions of the branches 22 and the ends of the bridge 18 on the lenses 10 can be approximately diametrically opposed. Depending on the shape of the lenses, it is also possible to move the branches 22 and the bridge 18 closer to the tops of the lenses.

An important advantage of the device according to the invention is that the positions of the branches and the bridge on the lenses are defined positively by the plastics material filament 14 that is tensioned in the peripheral groove on each lens. The tension in the filament 14 means that there is no slack in the mounting, even if the screws fixing the branches and the bridge to the lenses loosen slightly, and the lugs 16, 20 prevent the bridge and the branches rotating on the lenses.

What is more, the device according to the invention offers all the advantages of lightness in weight and attractiveness in appearance of prior art rimless eyeglasses whilst having the benefit of significantly improved solidity and stability.

I claim:

1. A method for forming a rimless eyeglass assembly including a pair of eyeglass lenses, a bridge member, and a pair of articulated temple branch members, each of said bridge and temple branch members having radial lug portions (34; 38) that extend radially inwardly of the associated lens, respectively, comprising;
    (a) attaching a first portion of a synthetic plastic filament (14) to one of said bridge and temple branch members;
    (b) inserting an adjacent second portion of the filament in a peripheral groove contained in an associated first eyeglass lens;
    (c) simultaneously tensioning said filament and attaching a third portion thereof to the other of said bridge and temple branch members;
    (d) drilling holes in said first lens via guide openings (36; 40) contained in said radial lug portions, respectively; and
    (e) fastening said lens to said bridge and the associated temple branch member by fastening means (42) that are inserted through said drilled holes and said guide openings, respectively.

2. The method as defined in claim 1, wherein said filament extends in tensioned relation substantially completely about the periphery of said first eyeglass lens.

3. The method as defined in claim 2, wherein said filament is continuous and extends through at least two openings (32) contained in a peripherally-extending lug portion of said temple branch member, said filament including two ends both of which are attached to said bridge member.

4. A rimless eyeglass assembly, comprising:
    (a) a pair of generally coplanar spaced eyeglass lenses (10);
    (b) a bridge member (18) extending between said lenses;
    (c) a pair of articulated temple branch members (22) arranged on the opposite sides of said lenses from said bridge member, respectively;

(d) each of said bridge and temple branch members including radial plug portions (34; 38) that extend radially across adjacent portions of the associated eyeglass lenses, respectively, each of said radial plug portions containing a guide opening 36; 40);

(e) each of said bridge and branch members including peripheral plug portions (16; 20) that extend peripherally of the associated eyeglass lens, respectively;

(f) a synthetic plastic filament (14) connected between the peripheral bridge lug associated with a first one of said lenses and the peripheral lug of the temple branch member associated with said first lens, said filament having an intermediate portion extending in tensioned relation within a peripheral groove contained in the edge portion of said first lens;

(g) each of said lenses containing drilled through openings opposite each of said guide openings, respectively; and (h) a pair of fastening means (42) extending through said drilled openings and said guide openings for fastening said first lens to said bridge and temple branch members, respectively.

5. A rimless eyeglass assembly as defined in claim 4, wherein said filament extends continuously substantially completely about the entire periphery of said first lens.

6. A rimless eyeglass assembly as defined in claim 5, wherein said filament has a pair of end portions connected with said bridge peripheral lug, and an intermediate portion that extends through at least one pair of holes (32) contained in said temple branch peripheral lug.

7. A rimless eyeglass assembly as defined in claim 6, wherein said filament intermediate portion extends through two pairs of said holes (32) contained in said temple branch peripheral lug.

8. A rimless eyeglass assembly as defined in claim 7, wherein said filament and portions are respectively fastened in at least one pair of holes (26) contained in the associated one of said bridge member peripheral portion.

* * * * *